United States Patent [19]
Goloff

[11] Patent Number: 5,709,248
[45] Date of Patent: Jan. 20, 1998

[54] INTERNAL ACCUMULATOR FOR HYDRAULIC SYSTEMS

[75] Inventor: C. Nickolas Goloff, Secor, Ill.

[73] Assignee: Caterpillar Inc., Peoria, Ill.

[21] Appl. No.: 723,407

[22] Filed: Sep. 30, 1996

[51] Int. Cl.⁶ ............................................. F16L 55/04
[52] U.S. Cl. .................. 138/30; 138/26; 138/28
[58] Field of Search ................. 138/30, 28, 31, 138/26; 220/720, 721, 723

[56] References Cited

U.S. PATENT DOCUMENTS

| | | | |
|---|---|---|---|
| 596,062 | 12/1897 | Firey | 138/28 |
| 2,275,505 | 2/1942 | Florian | 138/28 |
| 3,407,837 | 10/1968 | Fulton et al. | 138/28 X |
| 4,181,155 | 1/1980 | Wesselink et al. | 138/30 |
| 4,206,908 | 6/1980 | Mercier | 267/8 |
| 4,243,073 | 1/1981 | Hugley | 138/26 |
| 4,321,908 | 3/1982 | Reed | 138/28 X |
| 4,649,959 | 3/1987 | Wadleigh | 138/28 |
| 4,651,781 | 3/1987 | Kandelman | 138/30 |
| 4,823,844 | 4/1989 | Bartholomew | 138/30 |
| 4,838,316 | 6/1989 | Sugimura | 138/30 |
| 4,852,615 | 8/1989 | Still | 138/30 |
| 4,897,906 | 2/1990 | Bartholomew | 29/890.9 |
| 5,215,124 | 6/1993 | Hattori et al. | 138/30 |
| 5,368,073 | 11/1994 | Murphy | 138/30 |
| 5,456,787 | 10/1995 | Myles | 156/321 |

*Primary Examiner*—Patrick F. Brinson
*Attorney, Agent, or Firm*—J. W. Burrows

[57] ABSTRACT

Accumulators normally are teed into existing conduits and require large amounts of space or are placed in spool type bores having a spring biased piston slidably disposed therein. Most times these accumulators require a bladder that is vented to the atmosphere or a fluid chamber connected to a reservoir. In the subject invention, an accumulator 24 is provided that has a fluid filled member 36 which can be disposed in a closed chamber 32 of a housing 30 and connected to a source of pressurized fluid. The fluid filled member 36 has a fixed maximum surface to volume ratio and is capable of being compressed when subjected to a pressure higher than the pressure within. The accumulator may be integral with other components in the hydraulic system 10 and can be made with varying volumetric capacities and varying precharged pressures in order to match the requirements of the hydraulic system.

10 Claims, 2 Drawing Sheets

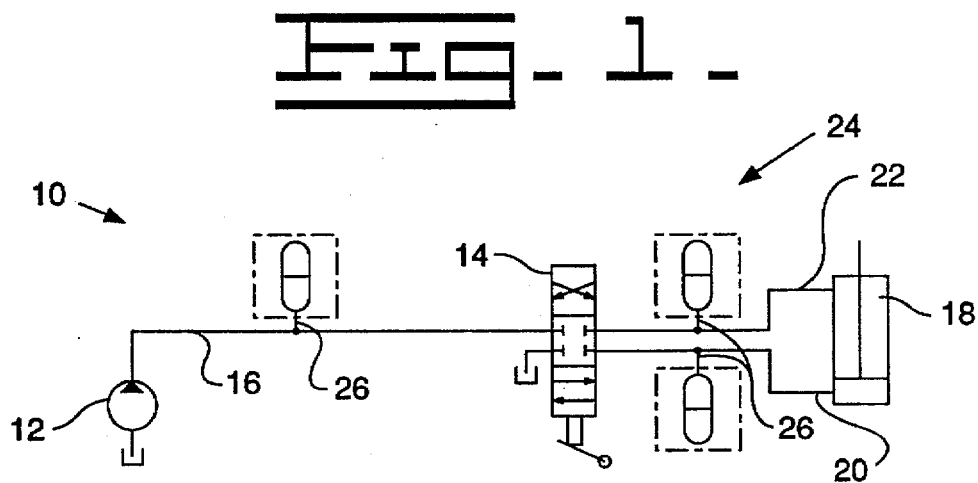
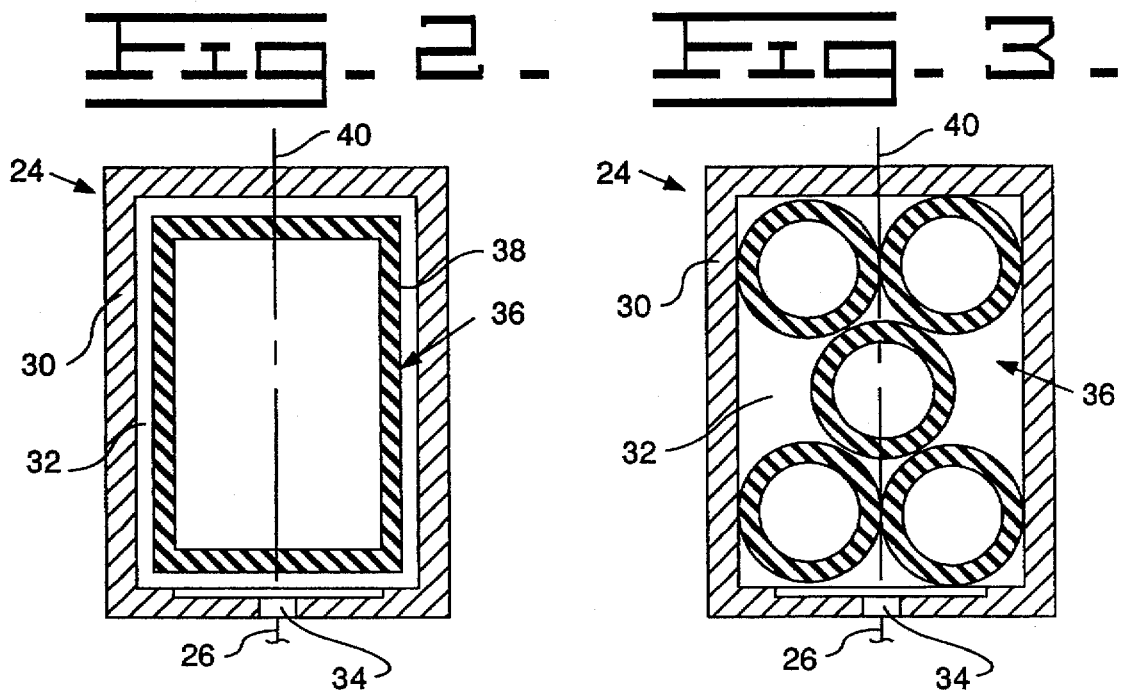

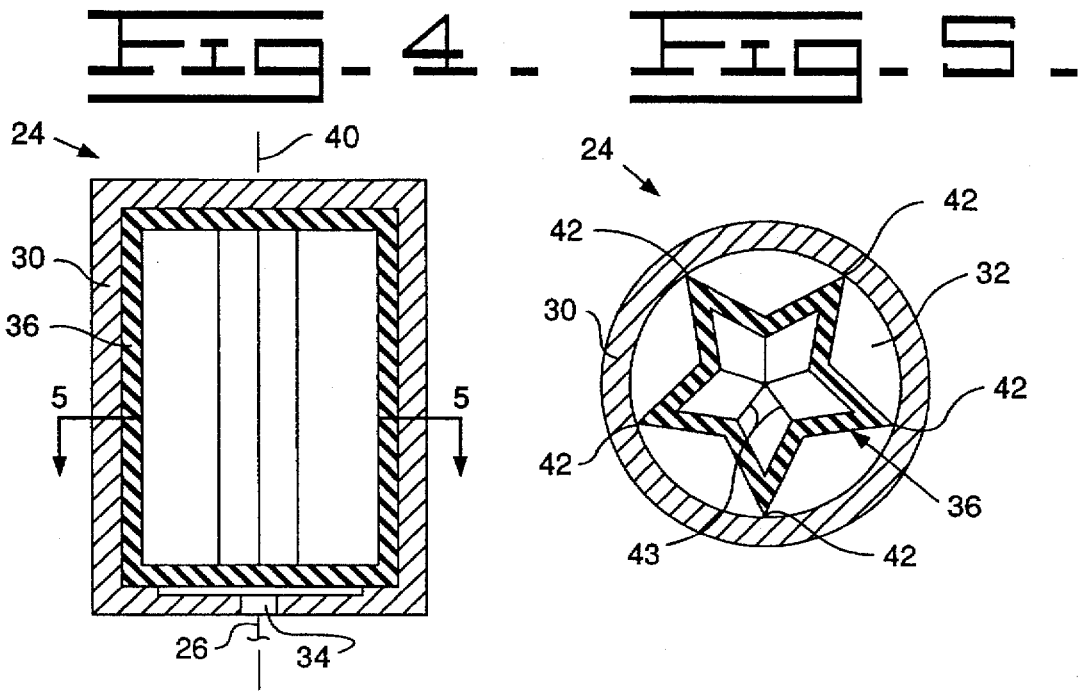
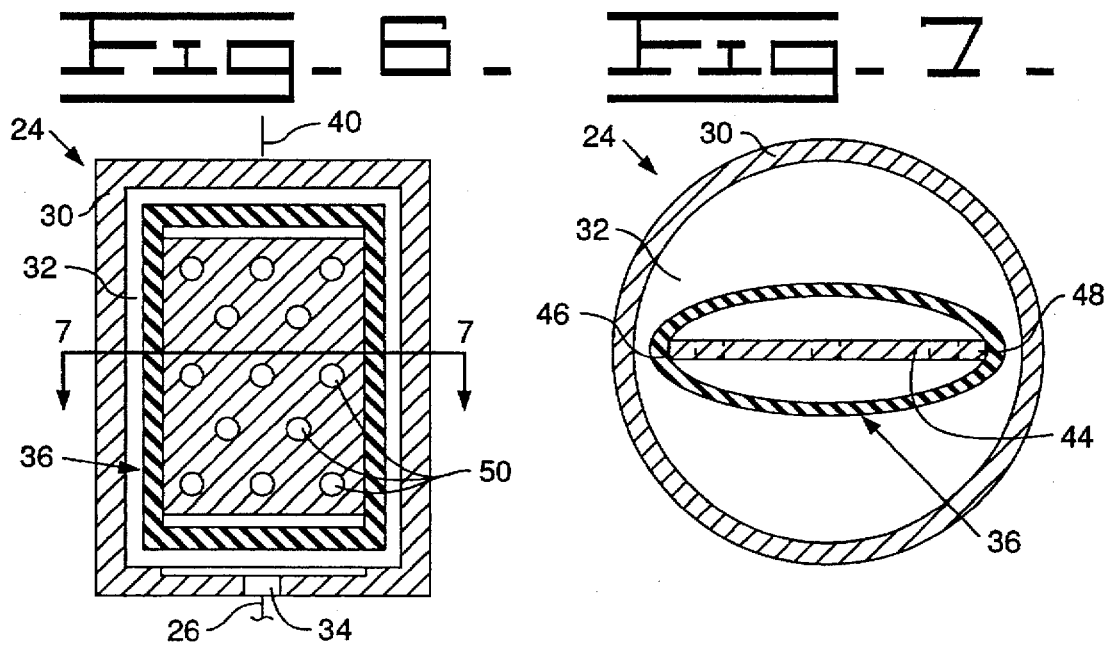

INTERNAL ACCUMULATOR FOR HYDRAULIC SYSTEMS

TECHNICAL FIELD

This invention relates generally to accumulators and more specifically to accumulators located within hydraulic systems that are an integral part of the system.

BACKGROUND ART

Accumulators for use in hydraulic systems are well known. These accumulators normally use a chamber having one end filled with a gaseous fluid and the other end connected to the hydraulic fluid with an elastomeric member separating the gas from the hydraulic fluid. In most applications, these types of accumulators are large in size and require extra space in order to place them in systems that are many times limited in space. Other types of accumulators have been used in order to conserve space. These types use a special spool type bore having a piston and a spring disposed therein to bias the piston in one direction. These types are also very expensive to incorporate in a hydraulic system since they require special controlled size bores and expensive machining. In the above types of accumulators, it is normally necessary to provide a vent to the atmosphere/reservoir or at least provide a pre-charge gas pressure.

The present invention is directed to overcoming one or more of the problems as set forth above.

DISCLOSURE OF THE INVENTION

In one aspect of the present invention, an accumulator is provided and adapted for use in a hydraulic system having a source of pressurized fluid. The accumulator includes a housing defining a closed chamber therein connected to the source of pressurized fluid by a conduit and a hollow, fluid filled member having a relatively fixed maximum surface to volume ratio and cable of being compressed.

BRIEF DESCRIPTION OF THE DRAWINGS

FIG. 1 is a schematic representation of a hydraulic system incorporating the subject invention;

FIG. 2 is a diagrammatic cross-sectional view of one embodiment of the present invention;

FIG. 3 is a diagrammatic cross-sectional view of another embodiment of the present invention;

FIG. 4 is a diagrammatic cross-sectional view of another embodiment of the present invention;

FIG. 5 is a cross-sectional view taken through line 5—5 of FIG. 4;

FIG. 6 is a diagrammatic cross-sectional view of another embodiment of the present invention; and FIG. 7 is a cross-sectional view taken through line 6—6 of FIG. 6.

BEST MODE FOR CARRYING OUT THE INVENTION

Referring to the drawings, and more particularly to FIG. 1, a hydraulic system 10 is illustrated and includes a source of pressurized fluid 12, such as a hydraulic pump, a directional valve 14 connected to the source of pressurized fluid by a conduit 16, a fluid actuator 18 connected to the directional valve 14 by respective conduits 20,22, and respective accumulators 24 of a plurality of accumulators connected to the respective conduits 16,20,22. Each of the accumulators 24 has a conduit 26 that connects the respective accumulator 24 to the appropriate conduits 16,20,22. Even though a plurality of accumulators 24 are illustrated, it is recognized that in some systems it may not be necessary to have all of the illustrated accumulators 24 and likewise some systems may require more accumulators depending on system needs. Even though the respective accumulators 24 are illustrated as being connected externally to the respective conduits 16,20,22, it is recognized that the respective accumulators 24 could be an integral part of the directional valve 16, the actuator 18, or other system components, such as hydraulic manifold blocks, without departing from the essence of the subject invention. Additionally, it is recognized that in order to make the accumulators 24 an integral part of the system, it is necessary only to provide a drilled or cored opening with a passage or conduit 26 connecting the drilled or cored opening with the source of pressurized fluid 12.

In the subject hydraulic system, the pressure in any conduit 16,20,22 may be considered as being a source of pressurized fluid 12. Consequently, any of the accumulators 24 may be disposed in any portion of the hydraulic system 10. As noted above the accumulators 24 may be integral with any system components. When the accumulators 24 are integral with the system components, the closed chamber 32 is formed in the component by a drilled passage or the like and the hollow, fluid filled member 36 is placed in the drilled passage. In some systems, such as integrated hydraulic systems, several different hydraulic components are disposed in one manifold block. Therefore it could be beneficial to provide a drilled passage therein that receives the member 36 and the needed passage 34 or conduit 26 is also an integral part of the manifold block.

Since each accumulator 24 of the plurality of accumulators are the same, only one will be described in detail hereafter. The accumulator 24 illustrated in FIG. 2 includes a housing 30, a closed chamber 32 defined therein, and a passage 34 connecting the closed chamber 32 with the conduit 26, and a hollow, fluid filled member 36 disposed in the closed chamber 32. In the subject embodiments, the fluid filled member 36 is a gas filled member. However it is recognized that the fluid filled member could be filled or partially filled with a liquid. The gas filled member 36 has a non-extensible cover 38 that maintains a fixed maximum surface to volume ratio at a predetermined pressure level of the pressurized gas contained therein. The gas filled member 36 is capable of being compressed when subjected to an external pressure that is greater than the pressure within.

The housing 30 is generally cylindrical in cross-section and defines a longitudinal axis 40. The gas filled member 36 has a shape generally the same as 5 the shape of the housing 30 and has a total volume less than the volume of the closed chamber 32.

Referring to FIG. 3, another embodiment of the subject accumulator 24 is illustrated. Common elements have like element numbers. In the arrangement of FIG. 3, a plurality of hollow, gas filled members 36 are disposed in the closed chamber 32. Each member 36 of the plurality of gas filled members is a generally spherically shaped member 36. Each member 36 could be the same size as illustrated or each could be different in size or a mix of equal and varied sizes.

Referring to FIGS. 4 and 5, another embodiment of the accumulator 24 is illustrated. Common elements have like element numbers. The hollow, gas filled member 36 disposed in the closed chamber 32 is a multi-sided member having a plurality of apexes 42 that extend parallel with the longitudinal axis 40 of the housing 30. The gas filled member 36 illustrated is shaped generally like a five pointed star, but it is recognized that various other multi-sided members could be utilized without departing from the essence of the subject invention. In order to ensure that the multi-sided member is generally an inextensible member, respective chords 43 are embedded at the inner apexes along the longitudinal length and secured one to one another generally at and along the longitudinal axis 40.

Referring to FIGS. 6 and 7, another embodiment of the accumulator 24 is illustrated. Common elements have like element numbers. The housing 30 and the gas filled member 36 of FIGS. 6 and 7 are elliptically shaped along the longitudinal axis 40. A rigid member 44 is disposed within the gas filled member 36 and has opposed sides 46,48 and a plurality of openings 50 defined therein. The opposed sides 46,48 are in intimate contact with opposed portions of the inner surface of the gas filled member 36. The intimate contact lies general parallel along the longitudinal axis 40.

It is recognized that various forms of the subject invention could be utilized without departing from the essence of the subject invention. For example, the hollow, gas filled member 36 could be an elastomeric member having a non-extensible "skin" to maintain the desired fixed maximum surface to volume ratio. Likewise, even though the accumulators 24 are illustrated diagrammatically as being large in size, it is recognized that the accumulators 24 are generally very small in size and are normally integral with other components within the hydraulic system 10. Additionally, the gas filled member 36 of the various embodiments could be filled or partially filled with a fluid having a volume and/or viscosity change when in the presence of an electrical field. Substituting such a fluid for the gas in the above embodiments would create an electrically selectable and dynamically variable device whose damping and compressibility characteristics could be modified continuously to suit specific control system needs. The diagrammatic representations are for illustrative purposes only.

INDUSTRIAL APPLICABILITY

During operation of the hydraulic system 10, pressurized fluid is directed from the source of pressurized fluid 12 through the directional valve 14 to the desired end of the actuator 18. The pressurized fluid in the respective conduits 16,20,22 is directed to the associated ones of the accumulators 24 through the respective conduit 26.

In the event of a failure in the source of pressurized fluid 12, the accumulator 24 connected to the conduit 16 provides a volume of pressurized fluid to the directional valve 14 until the pressure in the conduit 16 decreases to a level below the precharge of the accumulator 24. In systems where the source of pressurized fluid 12 is at a remote distance from the directional valve 14, the accumulator 24 can be positioned close to the directional valve 14. Consequently, when the directional valve 14 is moved to a position directing pressurized fluid to the actuator 18, any sudden rush of fluid to the actuator 18 can be supplemented by the accumulator 24 without permitting a decrease in the pressure of the fluid in the conduit 16 that might otherwise occur due to the frictional losses of the flow of fluid between the source of pressurized fluid 12 and the remotely located directional valve 14.

The accumulators 24 connected to the respective conduits 20,22 act to provide a volume of fluid to the actuator 18 to offset leakage in the actuator 18, to provide a damping or cushion to overcome pressure spikes developed in the respective conduits 20,22 during operation, or to provide a damping function to absorb the high loads attributed to the actuator 18 reaching the end of its travel.

In the subject embodiments, the accumulators are normally small in size and integral with other components of the system 10. Each of the accumulators 24 have a volumetric capacity in the range of 320–1250 cubit millimeters (approximately 0.5–2 cubic inches). It is recognized that the volumetric capacity could be larger than that noted above depending on system requirements and permissible space.

Referring to the embodiment of FIG. 2, since the conduit 26 and the passage 34 are connected, the pressurized fluid in the respective conduits 16,20,22 is in communication with the closed chamber 32 and in effective contact with the hollow, gas filled member 36. Once the pressure acting on the outer surface of the gas filled member 36 exceeds the pressure of the precharged gas, the gas filled member 36 compresses. The compression of the gas filled member 36 increases the usable volume of the closed chamber 32 and likewise increases the pressure of the gas within the gas filled member 36.

In the embodiment of FIG. 3, the pressurized fluid acts on the outer surface of each of the plurality of generally spherically shaped elements 36. By controlling the size and number of the generally spherically shaped elements 36, the hydraulic system can be closely "tuned" or controlled, as needed, in order to offset pressure spikes or cavitation.

In the embodiment of FIGS. 4 and 5, the pressurized fluid acts on the outer surface of the multi-sided gas filled member 36. By using a multi-sided gas filled member 36, a greater surface area may be exposed to the pressurized fluid in the hydraulic system 10. Consequently, the size of the closed chamber 32 may be smaller while still maintaining the desired characteristics of the accumulator 24 for the hydraulic system 10. Since, it is more difficult to cause a spherical or cylindrical surface to collapse, the multi-sided gas filled member 36 has many external surfaces for the pressurized fluid to act on.

In the embodiment of FIGS. 6 and 7, The pressurized fluid acts on the outer surface of the elliptical surface. By using an elliptical surface, the pressurized fluid acting on the external surface thereof causes the gas filled member 36 to more easily compress. The rigid member 44 disposed in the gas chamber functions to force the otherwise cylindrical member into an elliptical shape. The plurality of openings 50 permits unrestricted communication between opposite side of the rigid member 44. The gas filled member 36 is made generally by first placing the rigid member 44 inside the gas filled member 36, then sealing the ends at the same time that the inside of the chamber is filled and pre-pressurized with gas. In the subject embodiment, the gas filled member 36 could be, for example, a re-enforced elastomeric hose.

In each of the above noted embodiments, the gas filled member 36 is sized and pre-pressurized to meet the requirements of a particular hydraulic system. The precharge of the gas is controlled to a predetermined level. In order to ensure that the fixed maximum surface to volume ratio is maintain, the gas filled members 36 can be maintained in a pressurized vessel until installed in a housing or system.

The gas filled members 36 can be filled with gas in a controlled high pressure environment and when they are removed from the high pressure environment, the gas therein would be a pressurized gas at a predetermined pressure. In order to make the gas filled member 36 more dense, the gas chamber could be filled with a foam or other porous material.

In order to provide a quick way of determining which gas filled members of a certain size to use in specific applications, each gas filled member having a different precharge could be identified by different colors or have other identifying marks thereon.

In view of the foregoing, it is readily apparent that the accumulators 24 described herein are easily made integral with other components of the hydraulic system 10 and the volumetric capacities and precharged pressure can be controlled to satisfy the requirements of the particular hydraulic system. Likewise, it is apparent that the respective accumulators 24 may be placed in various locations within the hydraulic system 10 either integral with other components or connected to existing conduits.

Other aspects, objects and advantages of the invention can be obtained from a study of the drawings, the disclosure and the appended claims.

I claim:

1. An accumulator adapted for use in a hydraulic system having a source of pressurized fluid, the accumulator comprises:

a housing defining a closed chamber therein and a conduit interconnecting the closed chamber with the source of pressurized fluid; and a hollow, fluid filled member disposed in and spaced at least in part from the closed chamber and having a non-extensible cover that maintains a relatively fixed maximum surface to volume ratio and capable of being compressed when subjected to a pressure greater than the pressure within the hollow, fluid filled member.

2. The accumulator of claim 1 wherein the fluid filled member is filled with a fluid that exhibits a volume change when in the presence of an electrical field.

3. The accumulator of claim 1 wherein the shape of the fluid filled member is generally the same shape of the closed chamber.

4. The accumulator of claim 1 wherein the housing has a longitudinal axis and the fluid filled member is a multi-sided member having a plurality of outermost apexes extending parallel with the longitudinal axis of the housing.

5. The accumulator of claim 1 wherein the closed chamber in the housing has a longitudinal axis and is generally cylindrical in shape along the longitudinal axis, the fluid filled member has a rigid member disposed therein.

6. The accumulator of claim 5 wherein the fluid filled member has an initial cylindrical shape with a predetermined diameter and the rigid member has opposed sides spaced from one another a distance greater than the diameter of the initial shape of the fluid filled member so that when the rigid member is initially inserted into the fluid filled member, the shape of the fluid filled member is forced into an elliptical shape by opposed portions of the fluid filled member being forced outwardly by the opposed sides of the rigid member.

7. The accumulator of claim 6 wherein a plurality of opening are defined in the rigid member and operative to permit free communication from one side thereof to the other side.

8. The accumulator of claim 1 wherein a plurality of fluid filled members is disposed in the closed chamber.

9. The accumulator of claim 8 wherein each of the fluid filled members is spherical in shape.

10. The accumulator of claim 1 wherein the fluid filled member is filled with a fluid that exhibits a viscosity change when in the presence of an electrical field.

* * * * *